United States Patent [19]

Dornberger et al.

[11] 4,409,042

[45] Oct. 11, 1983

[54] METHOD AND APPARATUS FOR MEASURING THE TEMPERATURE OF MOVING ELONGATED ARTICLES AND APPLICATION THEREOF

[75] Inventors: Georg C. E. Dornberger; Robert E. Streich, both of Phoenix, Ariz.

[73] Assignee: Western Electric Company, Inc., New York, N.Y.

[21] Appl. No.: 360,105

[22] Filed: Mar. 19, 1982

[51] Int. Cl.³ .......................... C22F 1/00; B21C 9/00
[52] U.S. Cl. ..................................... 148/129; 374/130
[58] Field of Search ......... 148/129, 128, 154, 13.12 B; 266/78, 104, 87, 102, 99; 73/355 R, 355 EM; 250/338, 340; 356/43, 45, 48, 51

[56] References Cited

U.S. PATENT DOCUMENTS

| | | | |
|---|---|---|---|
| 1,946,184 | 2/1934 | Abbot | 126/424 |
| 3,266,313 | 8/1966 | Litterst | 73/355 R |
| 3,319,288 | 5/1967 | Johnson | 425/11 |
| 3,746,582 | 7/1973 | Gentry | 148/13 |
| 3,924,469 | 12/1975 | Brandli et al. | 73/355 EM |
| 4,081,680 | 3/1978 | Keller | 250/338 |
| 4,280,857 | 7/1981 | Dameron, Jr. | 266/87 |
| 4,290,182 | 9/1981 | Lawrence | 73/355 R |

FOREIGN PATENT DOCUMENTS 2365108  4/1978  France ................................. 356/43

*Primary Examiner*—L. Dewayne Rutledge
*Assistant Examiner*—S. Kastler
*Attorney, Agent, or Firm*—David P. Kelley

[57] ABSTRACT

A method and apparatus for measuring the temperature of a moving elongated article is disclosed wherein radiant heat is sensed eminating from the focal axis or point of a parabolic or paraboloidal reflector beside which the article moves. An application of such is also disclosed wherein the temperature of a wire sensed in this manner is used in regulating an annealer.

4 Claims, 7 Drawing Figures

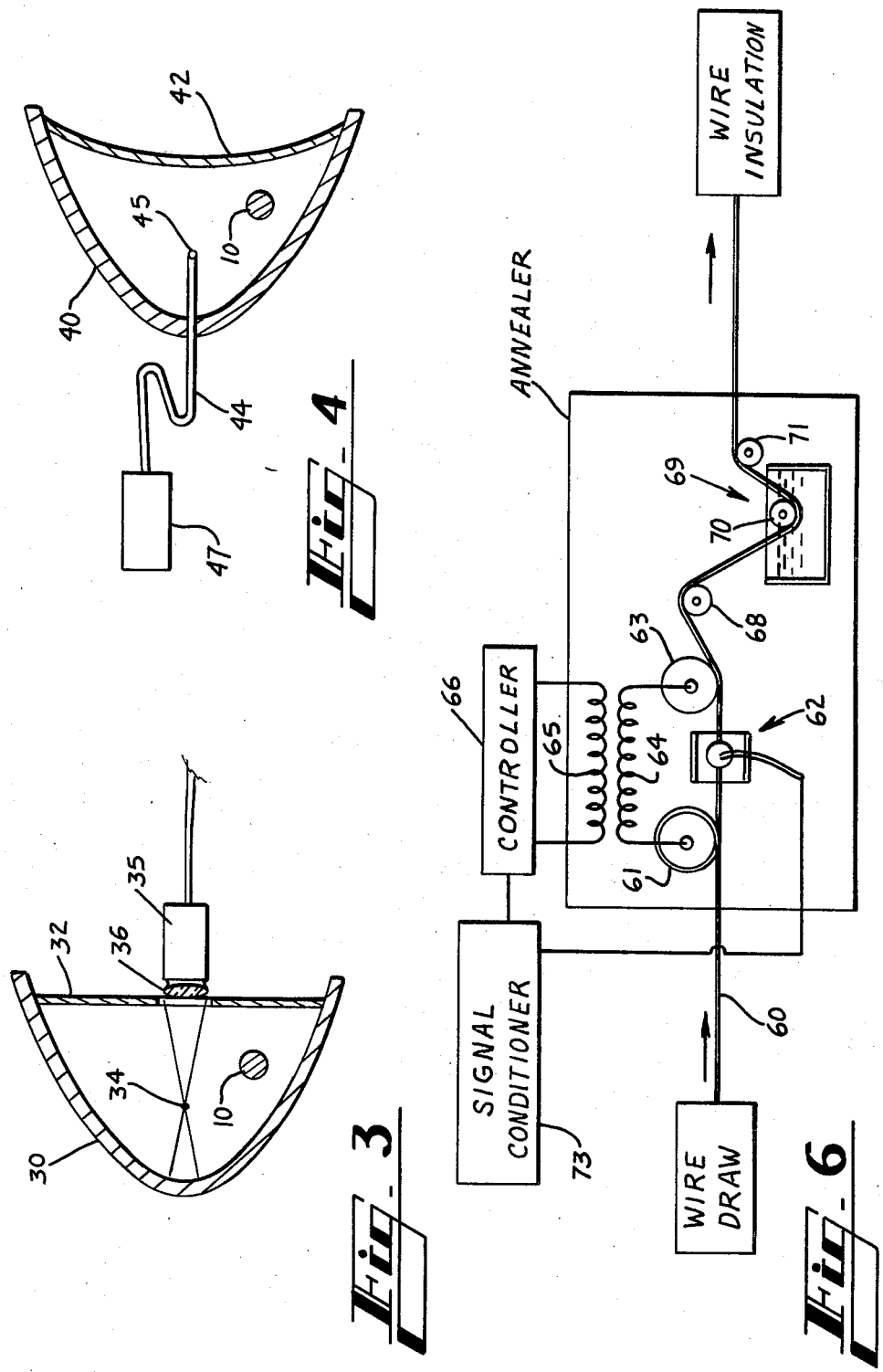

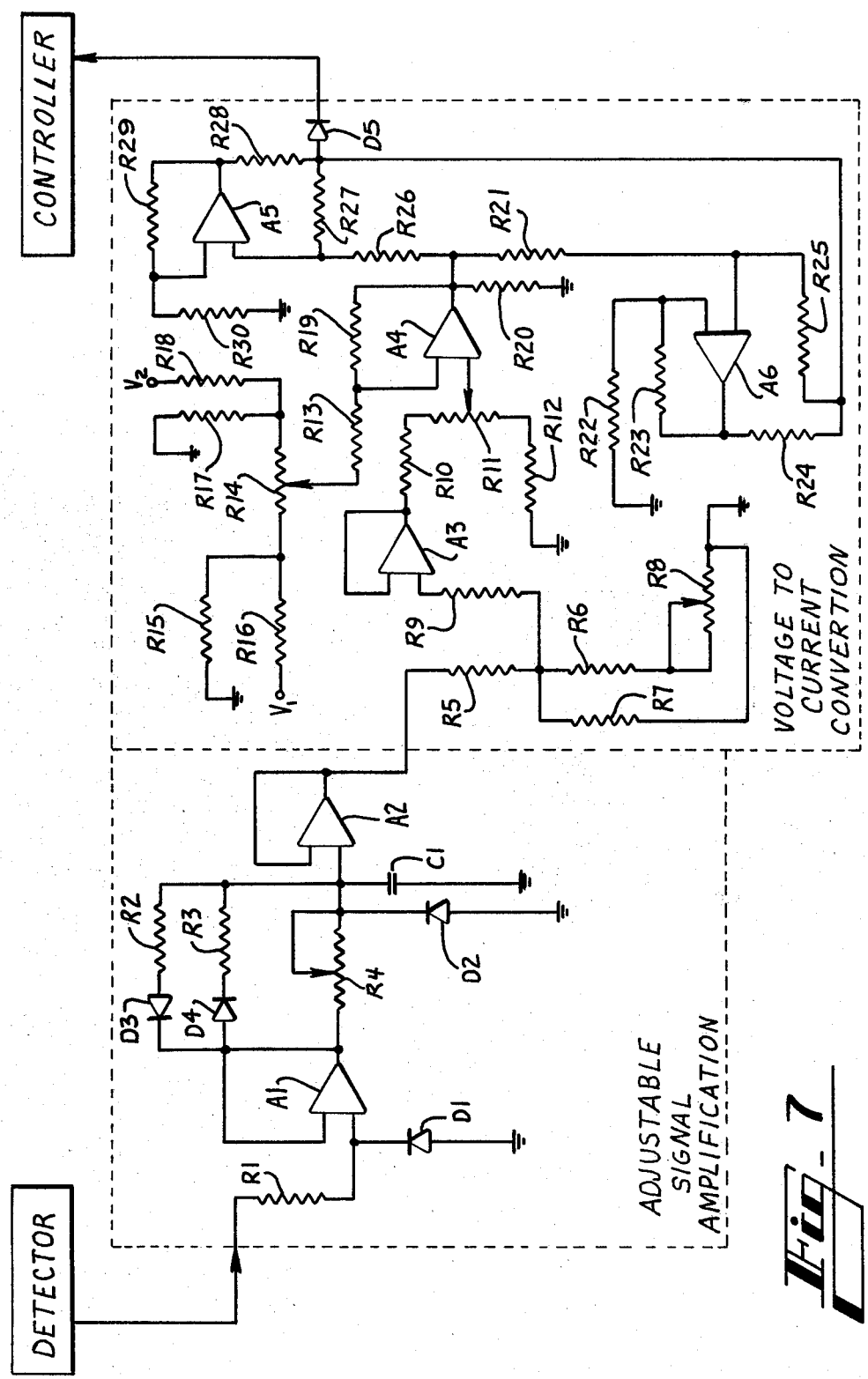

METHOD AND APPARATUS FOR MEASURING THE TEMPERATURE OF MOVING ELONGATED ARTICLES AND APPLICATION THEREOF

TECHNICAL FIELD

This invention relates generally to methods and apparatuses for measuring the temperature of moving elongated articles and to the use thereof in regulating a wire annealer or heater.

BACKGROUND OF THE INVENTION

In the manufacture of telecommunication wires copper conductors are produced from copper rods and then insulated with plastic or pulp. As the conductors are drawn from the copper rods they are cold-worked and then annealed to acquire proper elongation properties. In the annealing process the conductors, while moving at a speed of from 100 to 10,000 feet per minute, are heated to the required annealing temperature for a requisite period of time. The conductors typically vary in size from 10 to 26 gauge.

Within the annealer the copper conductor is typically advanced over two spaced, conductive rollers that serve as electrodes and then through a quenching bath. The roller-electrodes have a voltage impressed across them so that that portion of the conductor that momentarily spans them conducts an electrical current sufficient to become heated to its annealing temperature. The requisite period of annealing time is provided by conductor line speed control.

During the annealing period it is important that the conductor be at a particular temperature or at least within a narrow temperature range. If the conductor is annealed for an insufficient period of time it assumes an insufficient elongation quality thereby rendering it excessively brittle. Conversely, should its annealing temperature be too great then the conductor becomes excessively soft and the process itself wastes power. Heretofore, the temperature achieved has not been measured but merely increased or decreased as a result of elongation tests conducted on conductors previously annealed in the same annealer. It would be preferable, of course, to automate the annealer in order to maintain the proper temperature or temperature range and thereby avoid manufacturing nonconforming wire and reducing residual scrap.

The annealing temperature of the conductor may be increased by applying more power to it, i.e., by increasing its current flow through an increase in the voltage level cross the roller-electrodes. Voltage control itself is easy to provide. The problem in automating annealers however lies in the lack of an effective way of actually measuring the temperature of the moving conductor. It is necessary to make the temperature measurement in the annealer itself, since annealment is a function of time and temperature, before the conductor has had time to cool significantly in order to achieve an accuracy of measurement not dependent upon changes in ambient temperature. However, within the annealer the moving conductor tends to wobble or gyrate as it advances between the roller-electrodes. Temperature measuring devices of the direct contact type cannot be practically employed in this environment since the implantation of thermocouplers on a moving wire carrying high current is not feasible, other than for experimental purposes, and the routing of a gyrating wire against a stationary sensor such as a thermocouple wheel produces inaccurate results due to changes in angle of attack and contact area.

There are noncontact type temperature sensors available for measuring the temperature of moving, elongated materials such as electrically conductive wires. For example, infrared detectors can be employed to measure the temperature of moving objects. Thus, in U.S. Pat. No. 4,081,680 an infrared radiation burglar detector is employed to sense the presence of a human as it walks by the detector. This is done with a combination of housing ports and reflectors in which the infrared detector is mounted so as to sense the movement of the infrared energy radiating human source. U.S. Pat. No. 4,318,089 describes a similar system that uses a plurality of reflective surfaces and infrared sensors to produce a sequence of signals to trigger an alarm. U.S. Pat. No. 4,290,182, which is assigned to the assignee of the present invention, employs an infrared pyrometer for measuring the temperature of continuously moving strand material such as small gauge wire. This is done by positioning the article within a radiation absorbing cone and measuring the thermal radiation emitted from the article with a thermoradiation measuring device positioned proximate to the base of the cone. This technique substantially improves the repeatability of the temperature measurement by shielding the measuring device from stray radiation as well as substantially eliminating reflecting radiation from the article. While this device is useful in measuring conductor temperature after a conductor has been annealed, it is not as suitable in measuring the temperature within the annealer itself where the wire is at a much elevated temperature and is therefore softer and subject to wobbling.

Another pyrometric technique is disclosed in U.S. Pat. No. 3,924,469. Here, a continuously moving wire is passed through a cylindrical, metallic body having a reflective inner surface. A rotating mirror within the cylinder alternately directs the radiation from the heated wire and the reflected radiation from the cylinder walls to a pyrometer. The difference between the direct radiation and reflected radiation provides an indication of the wire temperature. Once again this type of device is not suited for measuring the temperature of a wobbling or gyrating wire.

It thus is seen that a need remains for a method and apparatus for measuring the temperature of a moving elongated article that tends to wobble or gyrate randomly about a preselected path of travel, and for the use of of such particularly in the annealment of conductive wires. It is to this task to which the present invention is primarily directed.

SUMMARY OF THE INVENTION

In one form of the invention a method is provided for measuring the temperature of a moving elongated article as it gyrates about a selected path of travel. The method comprises the steps of passing the article through a chamber cooler than the article beside a radiant heat reflective chamber wall of a shape having a focal axis or point, the path of travel being offset from the wall focal axis or point. During this time the magnitude of radiant heat eminating from the focal axis or point is sensed.

In another form of the invention apparatus is provided for measuring the temperature of a moving elongated article as it gyrates about a selected path of travel. The apparatus comprises a radiant heat reflector of a shape having a focal axis or point offset from the path of travel, and means for sensing the magnitude of radiant heat eminating from the focal axis or point.

In another form of the invention a method is provided for annealing a metallic wire which comprises the steps of passing the wire over two spaced electrodes across which a voltage is applied, sensing the temperature of the wire, and controlling the magnitude of the voltage as a function of sensed wire temperature.

In still another form the invention apparatus is provided for annealing a metallic wire. The apparatus comprises a pair of spaced electrodes over which the wire may be passed, means for sensing the temperature of the wire, and means for applying a voltage across the pair of electrodes of a magnitude dependent upon the sensed wire temperature.

BRIEF DESCRIPTION OF THE DRAWING

FIG. 3 is a cross-sectional view of apparatus embodying principles of the invention in another preferred form;

FIG. 4 is a cross-sectional view of apparatus embodying principles of the invention in another form;

FIG. 6 is a diagrammatic view of apparatus embodying princples of the invention in yet another form being used in practicing a method of the invention; and FIG. 7 is a circuit diagram of the signal conditioner component of the apparatus illustrated in FIG. 6.

DETAILED DESCRIPTION

Figure 1:
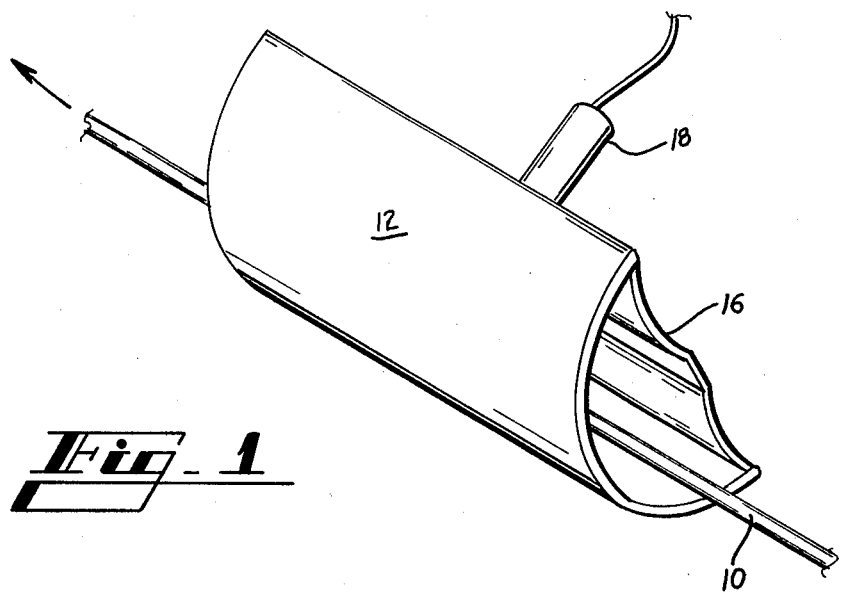
FIG. 1 is a perspective view of apparatus embodying principles of the invention in one preferred form shown being used in practicing a preferred form of the method of the invention.
Figure 2:
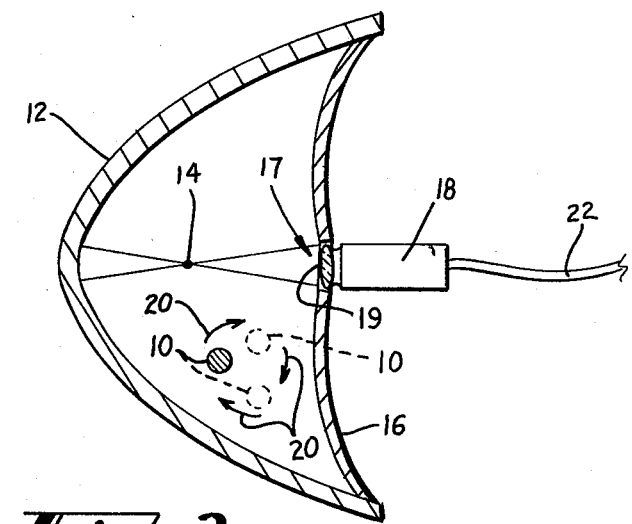
FIG. 2 is a cross-sectional view of tha apparatus shown in FIG. 1.

With reference next to FIGS. 1 and 2 apparatus is shown measuring the temperature of an electrically conductive copper wire 10 moving generally in the direction indicated by arrow 11. The apparatus comprises a heat reflector 12 of generally parabolic cross-sectional shape having a focal axis 14. Another arcuate heat reflector 16 is mounted to the reflector 12 so as jointly to form a tubular chamber having open ends through which the wire 10 passes. Both reflectors are preferably made of anodized aluminum or gold plated copper to minimize wavelength shifting of radiation reflected therefrom. The reflector 16 is provided with an aperture 17 adjacent which an infrared detector 18 is mounted to receive radiation passing through the aperture 17. A suitable infrared detector is model No. 65HX manufactured by the Mikron Instrument Company, Inc. The detector 18 is equipped with a lense 19 that is focused along the axis 14 of the parabolic reflector 12.

In use a conductive wire 10 at a temperature elevated above that of the temperature of the chamber is routed through the apparatus as shown in FIG. 1 along a path offset from that of the focal axis 14. As the heated wire is unsupported during its travel through the chamber itself it tends to wobble or gyrate about its selected path of travel as is indicated by the arrows 20 in FIG. 2. Radiation emitted omnidirectionally from the heated wire is concentrated along the focal axis 14. This is because a primary property of a parabolic reflector is that all rays traveling in one dimension (x or y) are focused at its focal point and, as a practical matter, rays traveling at small acute angles with respect to that dimension are reflected along paths passing sufficiently close to the focal point as to contribute further to such concentration. Thus, though radiation is emitted omnidirectionally from the wire initially a concentration occurs within a relatively few number of reflective incidents for the rays.

The wobbling movement of the wire does not tend to change the wavelength spectrum of the radiation significantly that is directed to the focal axis as it reflects off of the reflectors 12 and 16. Since the various rays do not, as a whole, reflect a relatively large number of times before they reach the focal axis, there is minimal change in their wavelengths occasioned by such reflections. Thus, the special response of the radiation scattered at the focal axis by the gaseous medium within the chamber, and detected by the detector 18, corrolates very closely with that of the radiation initially emitted by the heated wire. Since the spectrum of the initial radiation is a function of wire temperature, the detected spectrum corrolates very closely with the temperature of the wire itself. Furthermore, the intensity of the radiation detected by the infrared detector 18 tends to remain constant regardless of the position of the wire 10 at any particular moment as long as it remains offset from the axis itself. Upon sensing the radiation the detector emits an electrical signal over signal line 22 to a temperature read-out meter in conventional fashion or to a controller such as that shown in FIG. 6 as hereinafter described.

Figure 5:
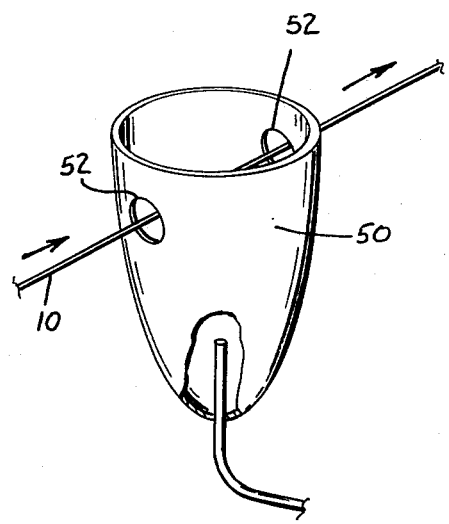
FIG. 5 is a perspective view of apparatus embodying principles of the invention in still another form.

FIGS. 3–5 illustrate alternative configurations that the temperature measuring apparatus may take. In FIG. 3, for example, a radiant heat reflector 30 of parabolic shape is shown to which is mounted a flat reflector 32 having an aperture through which radiant energy from the focal axis 34 of the reflector 30 may pass. An infrared detector 35 is mounted with its lense 36 focused upon the focal axis. Since the reflector 32 is planar it is simpler to manufacture than the arcuate reflector 16 in FIGS. 1 and 2. However, the reflector 16 does provide somewhat greater scattering than the reflector 32 which tends to enhance the concentration of radiant energy at the focal axis of the parabolic reflector. In FIG. 4 a parabolic heat reflector 40 is shown to which an arcuate reflector 42 is mounted which does not have the aperture that the prior two apparatuses have to accommodate the detector. Here instead an optical fiber 44 is seen to extend into the apparatus and to terminate with a concentrating lense 45 located along the axis of the parabolic reflector 40. The other end of the fiber is mounted to an infrared detector 47. Again, in use a wire 10 is passed through the apparatus offset from the focal axis of the parabolic reflector. In FIG. 5 yet another form of the invention is shown wherein a paraboloidally shaped heat reflector 50 is provided having two apertures 52 through which a wire 10 is passed. The top of the reflector 50 is covered by an unshown, disc-shaped reflector while an optical fiber 54 extends into its bottom and terminates with a lense affixed to the fiber end at the reflector focal point.

With reference next to FIG. 6 an application of the just described temperature measuring method and apparatus is shown in the wire annealing art. Here, a conductive wire 60 is seen to be fed from conventional wire drawing apparatus through an annealer to a conventional wire insulation line. Within the annealer the wire is looped over a first electrically conductive wheel or pulley 61, through wire temperature measuring apparatus 62, and then over a second electrically conductive wheel 63. An electric coil 64 is connected across the two wheels 61 and 63. This coil is inductively coupled with another coil 65 whose leads are connected to a controller 66. The controller may be a zero angle fired controller such as the single phase series CA-41 or the three phase series CA-43 manufactured and sold by the Barber Colman Company. The controller is used to control a.c. power applied to the coil 65. From the wheel 63 the wire is then routed over an idler 68 and into a quenching bath 69 under a submerged idler 70. The wire then emerges from the bath and is routed over another pulley or idler 71 and out of the annealer to the insulation line.

As shown in block diagram form in FIG. 6 the temperature measuring apparatus 62, which may be that of the type shown in one of the previous figures, is coupled to the controller 66 through a signal conditioner 73. This signal conditioner serves to amplify the signal generated by the infrared detector component of the temperature measuring apparatus, and to convert the voltage of the signal to a current sensitive signal compatible with the controller 66. Thus, where the previously mentioned CA-41 or CA-43 controller is used the signal conditioner delivers a 4 to 20 milliamps d.c. input signal to the controller 66.

FIG. 7 provides a schematic diagram of one such signal conditioner which amplifies the signal generated by the infrared detector and converts the detector's fluctating d.c. signal output to a 4 to 20 ma d.c. current responsive signal range thereby rendering it compatible with the input requirements of the CA-41 or CA-43 type controller. This is done in convention fashion as follows. With the use of current limiting resistor R1, and diodes D1 and D2 to insure that the d.c. input signal from the detector stays positive, the signal from the detector is amplified and then reamplified by two serially connected operational amplifiers A1 and A2. An adjustable resistor R4 between the output of amplifier A1 and the input of amplifier A2, across which resistors R2 and R3 are alternatively placed via diodes D3 and D4, provides means for adjusting the signal response time. In other words these resistors slow the response time so that time averaged rather than instantaneous voltage levels are amplified thereby eliminating voltage peaks. The amplified signal from amplifier A2 is then fed into the voltage to current convertor section of the circuit where further amplification of the signal is made by operational amplifier A3 to a level which avoids oscillation. A network of resistors R5-R9 here provides gain and non-linearity of sensing adjustment again to help keep the signal level under peak values. The output from amplifier A3 is then inputted via the series of resistors R10-R12 into operational amplifier A4. A reference voltage is provided amplifier A4 from voltage sources of opposite polarity $V_1$ and $V_2$ via the network of resistors R13-R18. This network includes an adjustable resistor R14 which provides offset gain adjustment. The output from amplifier A4 is then fed to operational amplifier A5 and A6. Their output signals are fed through resistors R28 and R24 respectively to a summing point and then through diode D5 to the controller. Voltage swings across R28 and R24 produce a current flow to the controller of between the 4 to 20 ma input requisite for that particular controller. The other resistors in the circuit serve as conventional biasing means while the capacitor C1 provides, in connection with R1, adjustable time delay for response time variation. One operative set of values for the circuit appear below in Table I.

TABLE I

| | |
|---|---|
| A1-A6 | LM 348 |
| C1 | $100 \times 10^{-6} F$ |
| R1 | 22K Ω |
| R2 | 10K Ω |
| R3 | 10K Ω |
| R4 | 50K Ω |
| R5 | 10K Ω |
| R6 | 10K Ω |
| R7 | 10K Ω |
| R8 | 5K Ω |
| R9 | 10K Ω |
| R10 | 10K Ω |
| R11 | 5K Ω |
| R12 | 10K Ω |
| R13 | 10K Ω |
| R14 | 5K Ω |
| R15 | 100K Ω |
| R16 | 10K Ω |
| R17 | 100K Ω |
| R18 | 10K Ω |
| R19 | 10K Ω |
| R20 | 1K Ω |
| R21 | 100K Ω |
| R22 | 100K Ω |
| R23 | 100K Ω |
| R24 | 200K Ω |
| R25 | 100K Ω |
| R26 | 100K Ω |
| R27 | 100K Ω |
| R28 | 200K Ω |
| $V_1$ | +15 VDC |
| $V_2$ | −15 VDC |
| D1 | IN482B |
| D2 | IN482B |
| D3 | IN482B |
| D4 | IN482B |
| D5 | IN482B |

Normally the temperature of a wire being annealed will vary from a possible low of 200° F. to a high of 1400° F. with 1000° being typical. The wire gauge will usually run from 10 gauge, having a nominal diameter of 0.1019 inch, to 26 gauge having a nominal diameter of 0.01594 inch. The maximum gyration of the moving wire is normally 0.5 inch of the centerline to each side of its selected path of travel. The frequency of its gyrations will vary with conditions such as line speeds and wire tension. The maximum frequency likely to be encountered is 1 KHz with heavier gauge wires tending to gyrate less than lighter gauge ones. Due to the annealing process taking place water vapor and steam will normally be present within the temperature measuring chamber as well as some carbon dioxide. Since carbon dioxide strongly absorbs radiation between 4.2 and 4.4 microns, and since water vapor absorbs strongly between 5.6 and 8 and between 2.6 to 2.9 microns, the infrared detectors should preferably be chosen such that their spectral response is in the 1.9 to 2.6 and 3.1 to 3.8 micron regions. Were spectral regions with high attenuation to be employed the temperature calibration and control point would vary with path length and humidity. It should also be pointed out that in the annealing application the absolute temperature of the wire does not have to be determined by the infrared detector itself. What is important is that a control point be established by means of the detector to assure that the proper final elongation of the wire is produced. For example, it does not matter whether the actual wire temperature is 834° F. or 800° F. so long as the relative control point temperature of the moving wire is established. With this new temperature measuring apparatus the relative temperature can be measured consistently within an accuracy of ±1%. In other applications, however, absolute temperature measurement may be desirable.

Finally, test results have shown that actual temperature measurement within a high degree of accuracy is achievable. For example, a paraboloidal copper reflector having a gold plated reflective surface shape approximating the function $x=y^2/4$ with a focal length of 1 inch and covered with a flat gold plated copper reflector at a distance of 2 inches from the focal point was used in measuring the temperature of a non-advancing 10 gauge copper wire gyrating approximately $\pm\frac{1}{4}$ inch. The temperature measured in accordance with the present invention corrolated better than 97% with actual temperature measurements made with thermocouples within the range of 600° F. to 1000° F.

It should be understood that the just described embodiments merely illustrate principles of the invention in selected, preferred forms. Many modifications, additions, and deletions may, of course, be made thereto without departure from the spirit and scope of the invention as set forth in the following claims.

What is claimed is:

1. The method of measuring the temperature of a moving elongated article as it gyrates about a selected path of travel comprising the steps of passing the article through a chamber cooler than the article within the bounds of a radiant heat reflective chamber wall of a substantially parabolic cross-sectional shape having a focal axis or point, the path of travel being offset from the wall focal axis or point, while sensing the magnitude of radiant heat eminating from the focal axis or point with an infrared detector.

2. The method of annealing a metallic wire comprising the steps of passing the wire over two spaced electrodes across which a voltage is applied, within the bounds of a radiant heat reflective wall of substantially parabolic cross-sectional or paraboloidal shape with the path of wire travel offset from the wall focal axis or point, sensing the temperature of the wire by sensing the magnitude of radiant heat emanating from the wall focal axis or point, and controlling the magnitude of the voltage as a function of sensed wire temperature.

3. The wire annealing method of claim 2 wherein the temperature of the wire is sensed between the two spaced electrodes.

4. The wire annealing method of claim 2 or 3 wherein the temperature of the wire is sensed with an infrared detector.

* * * * *